US 9,411,221 B2

(12) United States Patent
Kim et al.

(10) Patent No.: US 9,411,221 B2
(45) Date of Patent: Aug. 9, 2016

(54) MULTI-PROJECTION SYSTEM CAPABLE OF REFRACTING PROJECTION LIGHT OF PROJECTION DEVICE

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 210 days.

(21) Appl. No.: 14/218,356

(22) Filed: Mar. 18, 2014

(65) Prior Publication Data

US 2015/0002820 A1   Jan. 1, 2015

(30) Foreign Application Priority Data

Jun. 28, 2013 (KR) .................. 10-2013-0075920

(51) Int. Cl.
*H04N 9/31* (2006.01)
*G03B 21/26* (2006.01)
*G03B 31/00* (2006.01)
(Continued)

(52) U.S. Cl.
CPC . *G03B 31/00* (2013.01); *A47C 1/12* (2013.01); *A47C 3/18* (2013.01); *A63J 25/00* (2013.01); *E04H 3/22* (2013.01); *G02B 27/2271* (2013.01); *G03B 21/003* (2013.01); *G03B 21/14* (2013.01); *G03B 21/206* (2013.01); *G03B 21/2053* (2013.01); *G03B 21/26* (2013.01); *G03B 21/56* (2013.01); *G03B 21/60* (2013.01); *G03B 21/608* (2013.01); *G03B 29/00* (2013.01); *G03B 41/00* (2013.01); *H04N 9/3147* (2013.01); *H04N 9/3182* (2013.01); *H04N 9/3185* (2013.01); *H04N 9/3194* (2013.01); *A63J 2005/002* (2013.01); *G03B 37/04* (2013.01)

(58) Field of Classification Search
CPC ..... H04N 9/3147; H04N 9/31; G03B 21/147; G03B 21/14; G03B 21/26; G03B 2205/0023; G03B 21/60
USPC ................................ 353/94, 30, 31
See application file for complete search history.

(56) References Cited

U.S. PATENT DOCUMENTS 5,626,411 A *  5/1997  Takahashi ............... G02B 1/06
                                                  348/E17.005
5,964,064 A   10/1999  Goddard et al.
(Continued)

FOREIGN PATENT DOCUMENTS

JP   2005039788      2/2005
JP   2005227480 A    8/2005
(Continued)

OTHER PUBLICATIONS

Korean Office Action for application No. 10-2013-0075920 dated Aug. 29, 2014.
International Search Report for PCT/KR2013/011179 dated Mar. 24, 2014.

*Primary Examiner* — William C Dowling
*Assistant Examiner* — Ryan Howard
(74) *Attorney, Agent, or Firm* — Hauptman Ham, LLP

(57) ABSTRACT

The present invention provides a "multi-projection system" including a plurality of projection surfaces arranged so as not to be parallel to each other and two or more projection devices for projecting images on the plurality of projection surfaces, in which the two or more projection devices include a refraction projection device in which projection light is refracted before it reaches a projection surface.

16 Claims, 11 Drawing Sheets

(51) Int. Cl.

| | | |
|---|---|---|
| *E04H 3/22* | (2006.01) | |
| *G03B 21/56* | (2006.01) | |
| *G02B 27/22* | (2006.01) | |
| *G03B 21/608* | (2014.01) | |
| *G03B 21/14* | (2006.01) | |
| *A47C 1/12* | (2006.01) | |
| *A47C 3/18* | (2006.01) | |
| *A63J 25/00* | (2009.01) | |
| *G03B 29/00* | (2006.01) | |
| *G03B 41/00* | (2006.01) | |
| *G03B 21/00* | (2006.01) | |
| *G03B 21/20* | (2006.01) | |
| *G03B 21/60* | (2014.01) | |
| *A63J 5/00* | (2006.01) | |
| *G03B 37/04* | (2006.01) | |

(56) References Cited

U.S. PATENT DOCUMENTS

| | | | | |
|---|---|---|---|---|
| 6,034,717 | A * | 3/2000 | Dentinger | G02B 27/0093 348/51 |
| 6,540,363 | B1 * | 4/2003 | Steffensmeier | H04N 9/3147 348/745 |
| 6,814,448 | B2 * | 11/2004 | Ioka | H04N 9/3147 348/745 |
| 2008/0043097 | A1 | 2/2008 | Smith | |
| 2008/0150954 | A1 | 6/2008 | Trowbridge | |
| 2012/0081675 | A1 | 4/2012 | Kano | |
| 2014/0016099 | A1 * | 1/2014 | Choi | E04H 3/22 353/30 |

FOREIGN PATENT DOCUMENTS

| | | |
|---|---|---|
| KR | 1020060087597 A | 8/2006 |
| KR | 1020120051831 A | 5/2012 |

* cited by examiner

MULTI-PROJECTION SYSTEM CAPABLE OF REFRACTING PROJECTION LIGHT OF PROJECTION DEVICE

CROSS REFERENCE TO RELATED APPLICATION

This application claims the priority of Korean Patent Application No. 10-2013-0075920, filed on Jun. 28, 2013 in the KIPO (Korean Intellectual Property Office).

TECHNICAL FIELD

The present invention relates to a multi-projection system which can refract projection light of a projection device and, more particularly, to a multi-projection system in which all or some of projection devices that constitute the multi-projection system are configured in a manner that projection light can be refracted.

BACKGROUND ART

Conventionally, in order to reproduce images such as movies, advertisements, etc., two-dimensional images are projected on a single screen arranged in front of a theater. However, audiences can only watch two-dimensional (2D) images under such a system.

Three-dimensional (3D) image technologies for providing the audience with 3D images have recently been developed. 3D image technologies use the principle of allowing an audience to feel the 3D effect even from a flat image when different images are presented to the left and right eyes of the audience and combined in the brain. In detail, two cameras equipped with different polarizing filters are used during filming, and the audience wears glasses with polarizing filters such that different images are presented to the left and right eyes during watching.

However, while these 3D technologies can provide the audience with 3D images, the audience just watches the images reproduced on a single screen, which may reduce the degree of involvement in the images. Moreover, the direction of the 3D effect that the audience feels is limited to the direction of the single screen.

Furthermore, according to the conventional 3D technologies, the audience must wear the glasses equipped with polarizing filters during watching, which may make the audience feel inconvenient, and different images are artificially presented to the left and right eyes, which may make some sensitive audiences feel dizzy or nausea.

Therefore, a so-called "multi-projection system" which can solve the problems of the conventional projection systems based on a single screen has been proposed. The "multi-projection system" refers to a technology in which a plurality of projection surfaces are arranged around auditorium such that synchronized images are reproduced on the plurality of projection surfaces, thus providing the audience with the three-dimensional effect and immersion.

Meanwhile, in order to implement this "multi-projection system", it is necessary to arrange a "plurality of projection surfaces" around the auditorium and install "two or more projection devices" for projecting images on the plurality of projection surfaces. In this case, when the projection surfaces and the projection devices are installed to face each other, as in a typical projection system (i.e., a projection system with a single projection surface), various problems may occur (that is, when the "plurality of projection surfaces" and the "two or more projection devices" are installed to face each other, various problems may occur).

For example, the two or more projection devices installed to face the plurality of projection surfaces may be arranged in a complex manner within the visible range of the audience, which thus may reduce the immersion of the audience.

Moreover, the projection devices installed to face the projection surfaces facing each other (e.g., a left projection surface and a right projection surface, a front projection surface and a rear projection surface, etc.) may interrupt their projection operations.

Furthermore, when the two or more projection devices are installed to face the plurality of projection surfaces, some of the projection devices should be installed on the floor due to the difficulty in ensuring an installation space, and thus the projection devices installed on the floor have a risk of causing safety accidents. That is, since the theater is dark, the audience may fall over the projection device installed on the floor.

Therefore, there is a need to develop a new "multi-projection system" that can solve these problems.

DISCLOSURE OF INVENTION

Technical Problem

An object of the present invention is to provide a "multi-projection system" which can refract projection light of a projection device and project an image on a projection surface using the refracted projection light.

Solution to Problem

To achieve the above object, a multi-projection system in accordance with an embodiment of the present invention may comprise: a plurality of projection surfaces arranged so as not to be parallel to each other; and two or more projection devices for projecting images on the plurality of projection surfaces, wherein the two or more projection devices comprise a refraction projection device in which projection light is refracted before it reaches a projection surface.

The multi-projection system may further comprise a projection light refraction unit for refracting the projection light of the refraction projection device.

The projection light refraction unit may change the angle, at which the projection light of the refraction projection device is refracted, by movement of its body.

The projection light of the refraction projection may selectively reach all of the plurality of projection surfaces by the movement of the projection light refraction unit.

The refraction projection device and the projection light refraction unit may be provided plurally, and each projection light refraction unit may be configured to refract the projection light of each refraction projection device.

The plurality of refraction projection devices may be installed together in a space that does not affect the field of view of an audience.

The multi-projection system may further comprise a management device for controlling the plurality of refraction projection devices and the plurality of projection light refraction units, and the management device may control the angle, at which the projection light of each refraction projection device is refracted, by controlling each projection light refraction unit.

The management device may allow each refraction projection device to selectively project an image on all of the plurality of projection surfaces by controlling the angle at which the projection light of each refraction projection device is refracted.

The management device may store identification information of each refraction projection device and operation information of each projection light refraction unit in a matching manner, and the operation information of each projection light refraction unit may comprise a plurality of operation mode information.

The management device may analyze performance information of the plurality of refraction projection devices to select refraction projection devices that will be used for image projection and may control the angle, at which the projection light of each of the selected refraction projection devices is refracted, to allow images to be projected on the plurality of projection surfaces.

The performance information may comprise light intensity information of the refraction projection device, resolution information of the refraction projection device, or maintenance information of the refraction projection device.

The two or more projection devices may comprise a main projection device for projecting an image on a main projection surface.

The multi-projection system may further comprise an auxiliary projection device for projecting an image on an auxiliary projection surface arranged around the main projection surface, and the auxiliary projection device may be configured in the form of the refraction projection device.

The main projection device and the auxiliary projection device may be arranged together in a space that does not affect the field of view of an audience.

The auxiliary projection device may project an image at the entire time or at a specific time when the main projection device projects the image and the projection light of the auxiliary projection device may be projected after being refracted.

The refraction projection device may project an image on the main projection surface on behalf of the main projection device in the event of a failure of the main projection device.

The refraction projection device may be provided plurally and a refraction projection device, which is determined to have the best performance among the plurality of refraction projection devices, may project an image on behalf of the main projection device.

When the plurality of projection surfaces are of different types, the two or more projection devices may project corrected images, and the correction may be performed so as to offset differences in properties between the projection surfaces.

The differences in properties may comprise a difference in brightness, a difference in chromaticity, or a difference in reflectance.

Advantageous Effects of Invention

The present invention can refract projection light projected by a projection device and then allow the refracted projection light to reach a projection surface. Therefore, the projection light of the projection device can reach the projection surface even when the projection surface and the projection device are installed so as not to face each other.

Moreover, the present invention can refract projection light of a single projection device at different angles. Therefore, the present invention can allow the single projection device to selectively project images on a plurality of projection surfaces. For example, the present invention can refract the projection light of the single projection device such that an image can be projected on projection surface A, B, or C or on a different projection surface included in the plurality of projection surfaces.

Furthermore, the present invention can install two or more projection devices for projecting images on the plurality of projection surfaces together in a specific place of a theater. Specifically, the present invention can install the two or more projection devices together in a place (e.g., the rear of the auditorium) that is outside the field of view of the audience and then refract the projection light of each projection device to allow images to reach on the plurality of projection surfaces. Therefore, it is possible to project the images on the plurality of projection surfaces arranged in a single theater, without reducing the immersion of the audience and without interfering with the respective projection surfaces.

In addition, the present invention can install a larger number of projection devices (in which the projection light can be refracted) than the number of projection devices required to cover the projection surfaces arranged in the theater. Moreover, the present invention can analyze performance information (e.g., brightness information, resolution information, maintenance information, etc.) of the projection devices during each screening and then select and use projection devices having excellent performance. Therefore, the performance of the projection devices used to project images can be ensured, and thus the quality of the projected images can be ensured. Furthermore, a projection device having a problem in the performance can be automatically eliminated, and thus the multi-projection system can operate normally even in the event of a failure of a specific projection device.

Additionally, the present invention can allow an auxiliary projection device to substitute for a main projection device in the event of a failure of the main projection device. Specifically, in the event of a failure of the main projection device, the present invention can transmit a main image to the auxiliary projection device such that the auxiliary projection device projects the main image and refract the projection light of the auxiliary projection device to reach a main projection surface, thus allowing the auxiliary projection device to substitute for the main projection device.

Also, the present invention can analyze performance information of each auxiliary projection device to select an auxiliary projection device that will substitute for the main projection device and allow the selected auxiliary projection device, which is determined to have the best performance, to substitute for the main projection device. Therefore, it is possible to project an image of the best quality even in the event of a failure of the main projection device.

MODE FOR THE INVENTION

Figure 1:
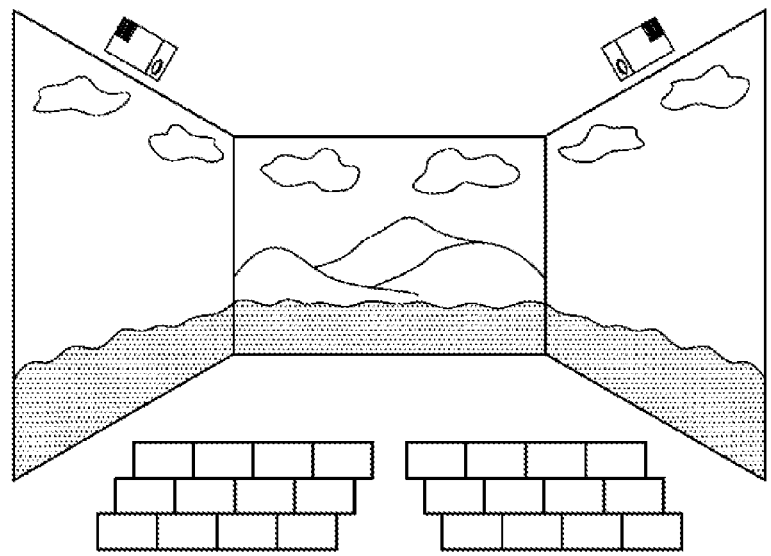
FIGS. 1 to 3 are diagrams showing examples of a plurality of projection surfaces.

Hereinafter, a "multi-projection system that can refract projection light of a projection device" according to the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

The present invention that will be described below relates to the above-mentioned "multi-projection system".

Therefore, the "multi-projection system" that is the basis of the present invention will now be described briefly, and then the features of the present invention will be described in detail later.

Next, the multi-projection system that is the basis of the present invention will be described with reference to FIGS. 1 to 4.

The multi-projection system that is the basis of the present invention refers to a system which can provide synchronized images on a plurality of projection surfaces installed in a single theater and maximize the reality, three-dimensional effect, and immersion that the audience can feel in these environments. That is, the multi-projection system refers to a system in which a plurality of projection surfaces are provided in a single theater to provide the audience with synchronized images on the plurality of projection surfaces.

The plurality of projection surfaces are provided for multi-projection in a single theater. A plurality of images may be reproduced on the plurality of projection surfaces. Here, it is preferable that the images reproduced on the plurality of projection surfaces are synchronized with each other and generally create a unified image. That is, while different images may be reproduced on the respective projection surfaces, it is preferable that the different images are synchronized with each other to create a unified image when viewed over the entire projection surface. Meanwhile, depending on the situations, an independent image may be reproduced on each projection surface or images may be reproduced only on some of the projection surfaces.

Meanwhile, the plurality of projection surfaces may reproduce images using all of the plurality of projection surfaces or using only some of the plurality of projection surfaces. For example, the plurality of projection surfaces may provide a state in which an image is reproduced only on a specific projection surface (state 1), a state in which images are reproduced only on some of the plurality of projection surfaces (state 2), and a state in which images are reproduced on all of the plurality of projection surfaces (state 3), and these states 1 to 3 may be implemented alternately during projection of image content.

Moreover, the plurality of projection surfaces may be arranged so as not to be parallel to each other. According to the prior art, an image is projected only on a screen placed in front of a theater such that the audience watches the image reproduced on the two-dimensional screen or a 3D technology is applied to the image itself reproduced on a plane. On the contrary, in the multi-projection system that is the basis of the present invention, the plurality of projection surfaces are three-dimensionally arranged so as not to be parallel to each other, and thus it is possible to provide the audience with a three-dimensional image with high three-dimensional effect and immersion through the three-dimensionally arranged plurality of projection surfaces without applying the 3D technology to the image itself.

Furthermore, it is preferable that the plurality of projection surfaces are arranged so as not to be parallel to each other and arranged to surround the auditorium in the theater. Therefore, the audience can feel as if they are in a space created by the synchronized images reproduced on the plurality of projection surfaces, and thus the three-dimensional effect, immersion, and virtual reality that the audience feels can be maximized.

In addition, the angle between the projection surfaces is not limited to a specific angle, and the plurality of projection surfaces may be arranged at various angles as long as the audience can feel the three-dimensional effect.

Additionally, the plurality of projection surfaces may be arranged to be adjacent to each other or to be spaced from each other and, even in this case, it is preferable that the plurality of projection surfaces are arranged to surround the auditorium.

Figure 2:
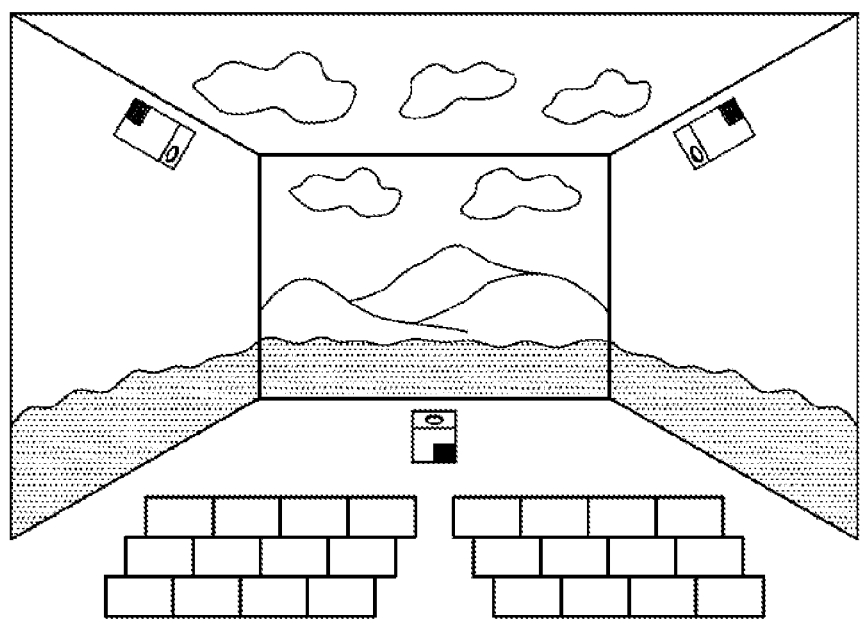
Figure 3:
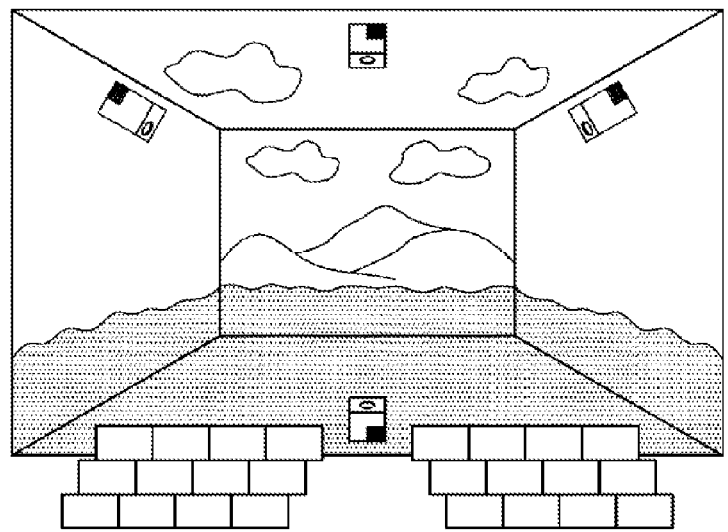

FIG. 1 shows an example in which the plurality of projection surfaces are arranged on the front, left, and right sides with respect to the auditorium, FIG. 2 shows an example in which the plurality of projection surfaces are arranged on the front, left, right, and top (ceiling) sides with respect to the auditorium, and FIG. 3 shows an example in which the plurality of projection surfaces are arranged on the front, left, right, top (ceiling), and bottom (floor) sides with respect to the auditorium.

Figure 4:
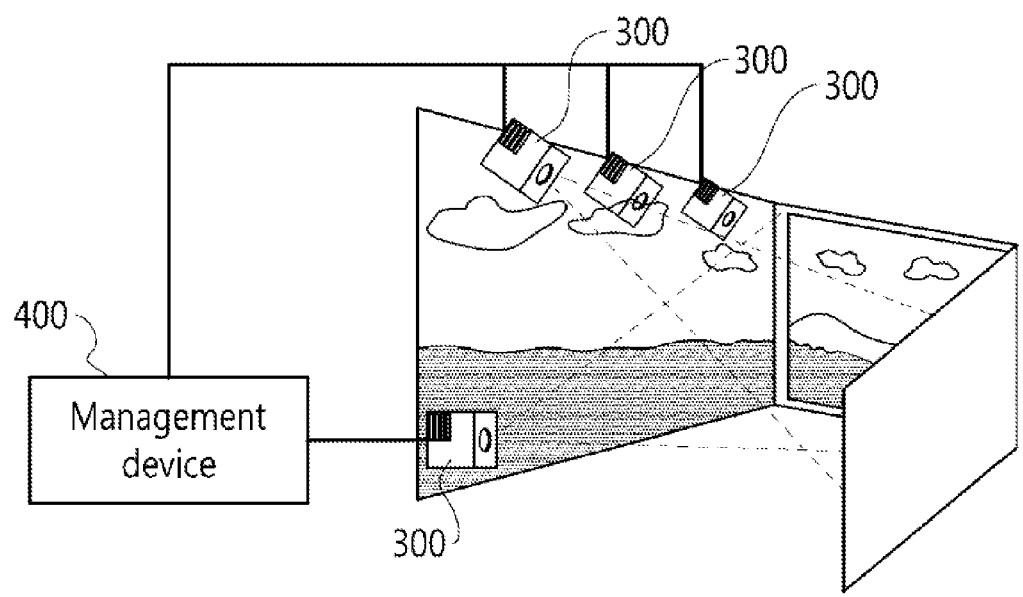
FIG. 4 is a diagram showing an example of a multi-projection system comprising a plurality of projection surfaces, two or more projection devices, and a management device in accordance with an embodiment of the present invention.

Meanwhile, referring to FIG. 4, the multi-projection system may further comprise two or more projection devices 300 for projecting images on the plurality of projection surfaces and may also further comprise a management device 400 for controlling the operation of the two or more projection devices 300.

The two or more projection devices 300 are configured to project images on the above-described plurality of projection surfaces. The two or more projection devices 300 may be implemented by including an optical system and a heating unit in various manners. For example, the projection devices 300 may be implemented in various ways, such as by using a cathode ray tube (CRT), using a liquid crystal display (LCD), by digital light processing (DLP) using a digital micromirror device (DMD) chip, by liquid crystal on silicon (LCoS), etc. Moreover, the projection devices 300 may be implemented in various forms other than these ways.

The management device 400 is configured to control the two or more projection devices 300. The management device 400 may be connected in parallel to the two or more projection devices 300 to control the respective projection devices 300 either simultaneously or individually through this parallel connection. Moreover, the management device 400 may integratedly manage the images projected by the two or more projection devices 300 and may correct the images projected by the two or more projection devices 300, if necessary. Meanwhile, the management device 400 may integratedly control the operation of various devices included in the multi-projection system as well as the operation of the two or more projection devices 300.

The management device 400 may be implemented with various electronic devices. The management device 400 may be implemented with a single electronic device or with several electronic devices interconnected to each other. For example, the management device 400 may be implemented in a single server or in such a manner that two or more servers are interconnected. Moreover, the management device 400 may be implemented in such a manner that a server and other electronic devices are interconnected or implemented in arithmetic units other than the server.

Meanwhile, the management device 400 may be implemented with a plurality of servers connected hierarchically. For example, the management device 400 may be implemented in such a manner that a single main server and a plurality of slave servers are connected to each other. In this case, the plurality of slave servers respectively control the devices installed in the multi-projection system (e.g., slave server 1 controls projection devices A-D, slave server 1 controls projection devices E-H, etc.), and the single main server generally controls the operation of the plurality of slave servers.

Meanwhile, the plurality of projection surfaces that constitute the multi-projection system may be configured in various forms such as a screen, an internal structural surface (e.g., floor, wall, ceiling, etc.), etc.

Moreover, the plurality of projection surfaces may comprise the same type of projection surfaces, but may preferably comprise various types of projection surfaces. For example, the plurality of projection surfaces may comprise (i) different types of screens, (ii) different types of internal structural surfaces, (iii) different types of screens and internal structural surfaces, etc.

However, when the plurality of projection surfaces are configured with these various types of projection surfaces, heterogeneity may occur between images reproduced on the plurality of projection surfaces. Specifically, the respective projection surfaces that constitute the plurality of projection surfaces have different properties, and thus the heterogeneity may occur between the images reproduced on the respective projection surfaces. Therefore, it is necessary to remove the heterogeneity between the images, because the heterogeneity may reduce the immersion and three-dimensional effect of the audience in the images.

The present invention may perform image correction based on differences in properties between the projection surfaces, and this image correction can improve the heterogeneity of the images reproduced on the plurality of projection surfaces.

The image correction will now be described in detail. The image correction may comprise the steps of (1) analyzing differences in properties between the projection surfaces and (2) performing the image correction so as to offset the differences in properties based on the analyzed information on the differences in properties between the projection surfaces.

First, step (1) (of analyzing the differences in properties between the projection surfaces) may preferably be performed by the management device 400. In this case, the management device 400 may analyze the information on the differences in properties between the projection surfaces by various methods such as a method of using information stored in an internal database, a method of using an imaging device, etc. Here, the method of using information stored in a database refers to a method in which individual information on the properties of each projection surface (e.g., chromaticity information, brightness information, reflectance information, quality information, etc.) is stored in a database such that the management device 400 analyzes the information on the differences in properties between the projection surfaces based on the information stored in the database. Moreover, the method of using an imaging device refers to a method in which an imaging device for imaging the plurality of projection surfaces is provided to analyze the information on the differences in properties between the projection surfaces based on the images taken by the imaging device.

Next, step (2) (of performing the image correction so as to offset the differences in properties based on the analyzed information on the differences in properties between the projection surfaces) may also be performed by the management device 400. In this case, the management device 400 may correct the images projected on the respective projection surfaces so as to offset the differences in properties based on the analyzed information on the differences in properties between the projection surfaces (e.g., chromaticity information, brightness information, reflectance information, quality information, etc.), thus reducing the heterogeneity between the images reproduced on the plurality of projection surfaces.

Representatively, the correction based on the information on the difference in chromaticity between the projection surfaces will now be described (the process which will be described below can, of course, be applied to the correction based on the difference in brightness, difference in reflectivity, difference in quality, etc.). First, the management device 400 may calculate the information on the difference in chromaticity between the projection surfaces based on chromaticity information of the respective projection surfaces. In detail, the management device 400 may set a single reference projection surface and then calculate information on a relative difference in chromaticity of each projection surface. For example, the information on the relative difference in chromaticity is calculated in such a manner that "projection surface A has a red (R) color level 50 higher than that of the reference projection surface, a green (G) color level 40 higher than that of the reference projection surface, and a blue (B) color level the same as that of the reference projection surface". After the information on the difference in chromaticity of the respective projection surfaces is calculated in this manner, the images may be corrected based on the calculated information in such a manner so as to "reduce the R color level of the image projected on projection surface A by 50, reduce the G color level by 40, and maintain the B color level", for example. Therefore, the difference in chromaticity of the projection surfaces can be offset.

Meanwhile, the analysis of the difference in properties of the plurality of projection surfaces may be performed in various ways other than the method of setting the reference projection surface. For example, it is possible to calculate representative values (e.g., mean values, median values, mode values, etc.) for the properties of the plurality of projection surfaces and then analyze the relative difference in properties based on the calculated representative values.

Next, a "multi-projection system" in accordance with an embodiment of the present invention will be described with reference to FIGS. 5 to 9.

Figure 5:
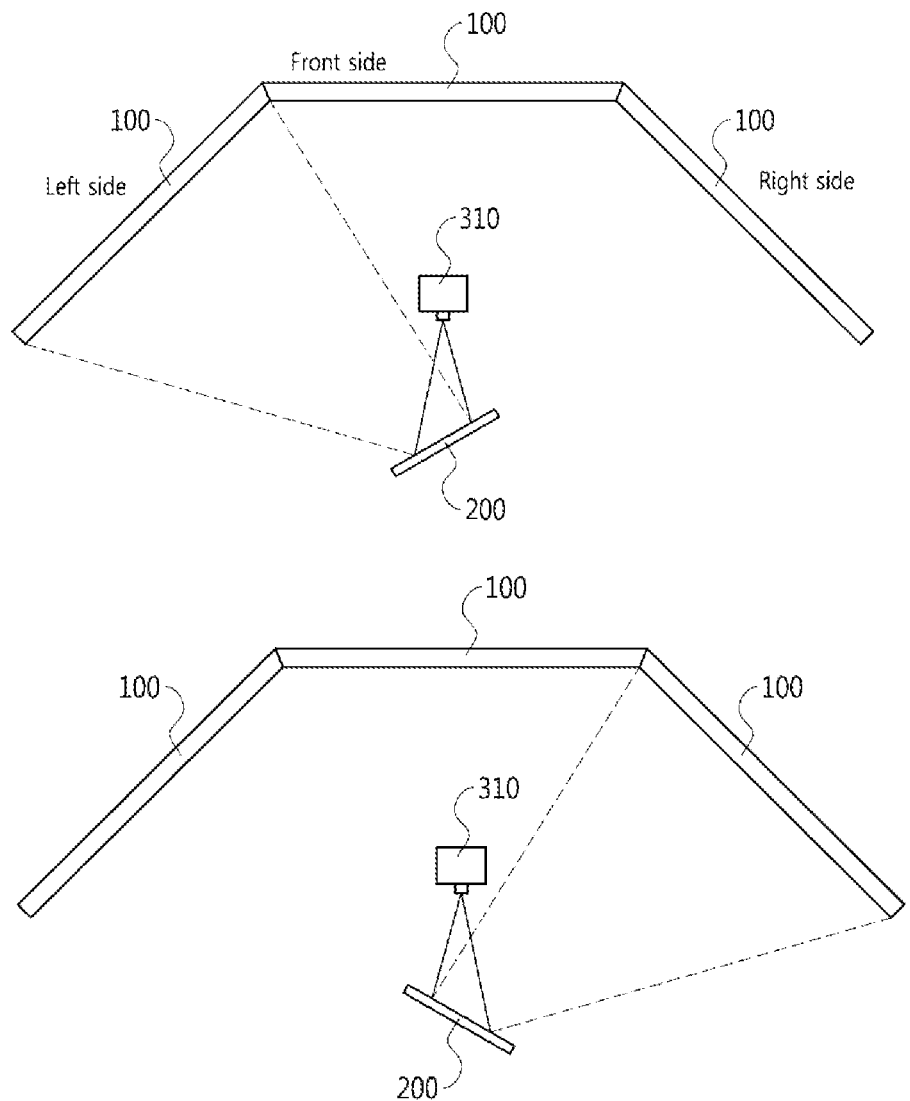
FIGS. 5 and 6 are diagrams showing examples of a multi-projection system according to the present invention that selectively projects an image on a plurality of projection surfaces by refracting projection light of a single projection device.
Figure 6:
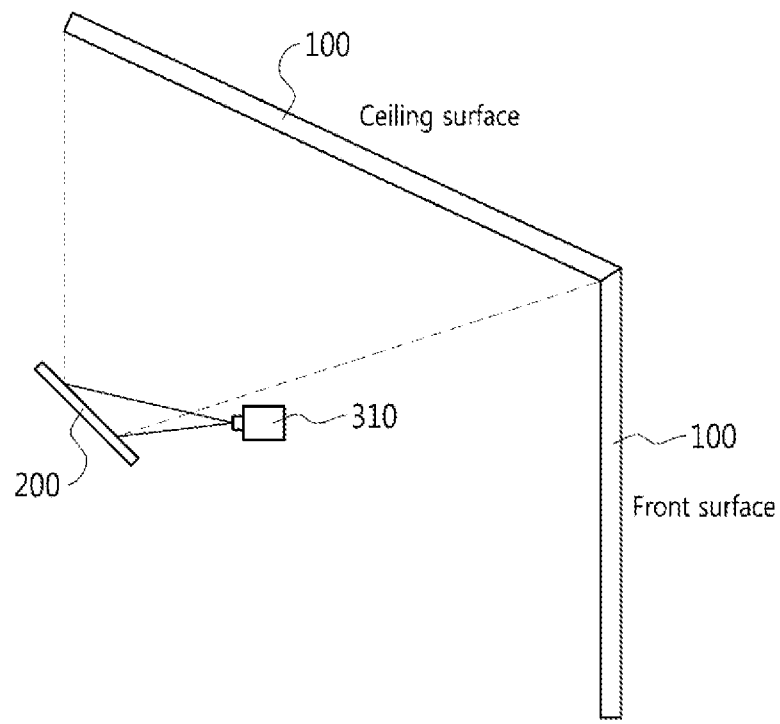
Figure 6:
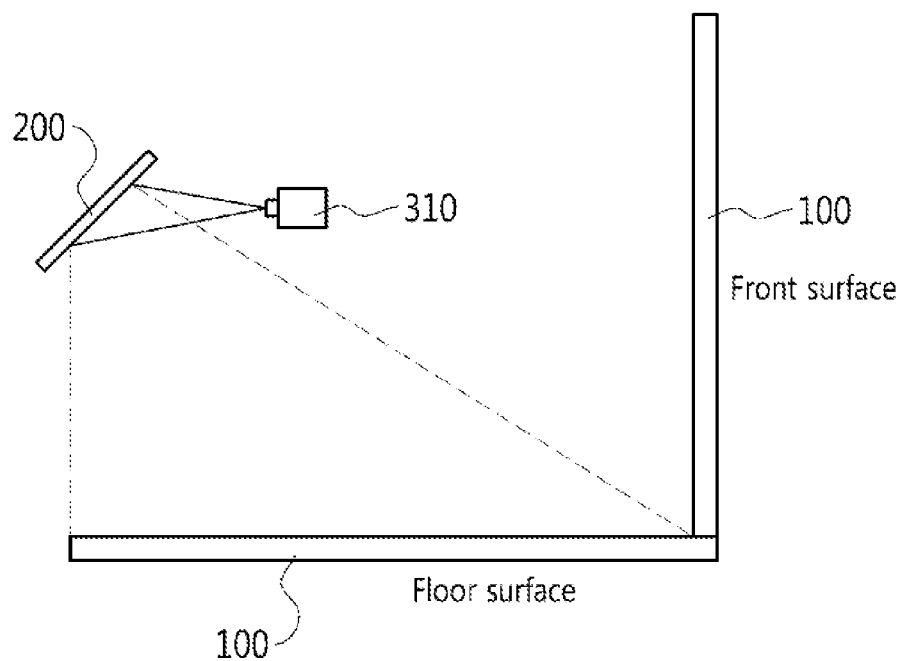
Figure 7:
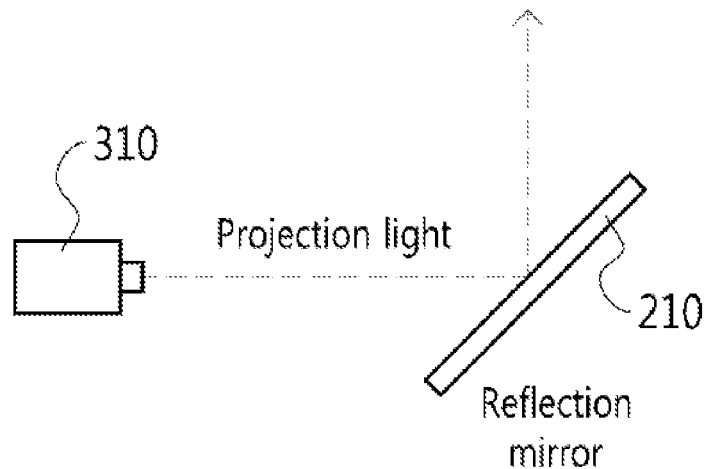
FIG. 7 is a diagram showing an example of a projection light refraction unit.
Figure 7:
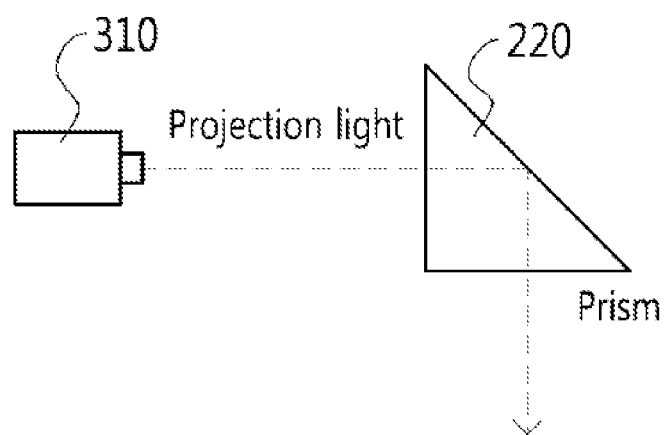
Figure 7:
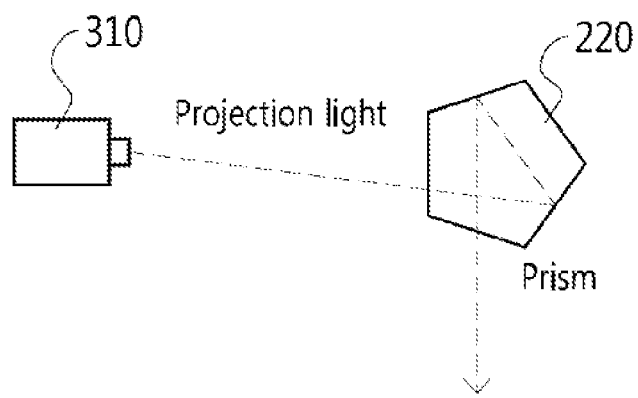

Referring to FIGS. 5 to 7, the multi-projection system in accordance with an embodiment of the present invention may comprise a plurality of projection surfaces 100 arranged so as not to be parallel to each other and two or more projection devices 300 for projecting images on the plurality of projection surfaces 100, and each of the two or more projection devices 300 may comprise a refraction projection device 310 in which projection light is refracted before it reaches a projection surface.

Moreover, the multi-projection system may further comprise a projection light refraction unit 200 for refracting the projection light of the refraction projection device 310.

The refraction projection device 310 refers to a projection device in which its projection light is refracted before it reaches a specific projection surface 100. Specifically, the refraction projection device 310 refers to the projection device 300 that can project images even on a projection surface arranged so as not to face it (i.e., arranged in a direction other than the front) using the refracted projection light.

This refraction projection device 310 may allow its projection light to be refracted in various ways, preferably by means of the projection light refraction unit 200 installed in a direction of the projection light.

The projection light refraction unit 200 is configured to refract the projection light projected by the refraction projection device 310 at different angles in a three-dimensional space.

Figure 13:
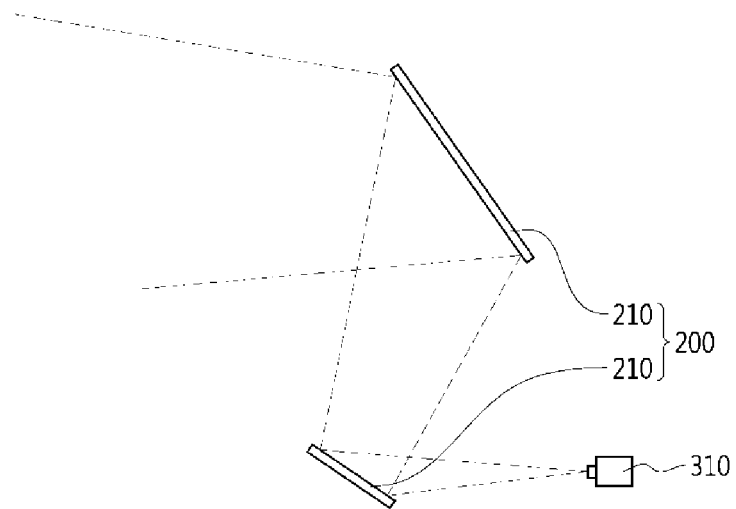
FIG. 13 is a diagram showing an example of a projection light refraction unit according to the present invention comprising two or more optical devices.

The projection light refraction unit 200 may be implemented with various optical devices, which can refract the projection light of the refraction projection device 310, such as a reflection mirror 210, a prism 220 (e.g., a right-angled prism, a regular triangular prism, or a pentaprism), etc. Moreover, the projection light refraction unit 200 may comprise two or more optical devices such as two or more reflection mirrors 210, two or more prisms 220, or two or more reflection mirrors 210 and a prism 220, and this embodiment is shown in FIG. 13.

Moreover, it is preferable that the projection light refraction unit 200 is installed in a direction of the projection light of the refraction projection device 310. For example, the projection light refraction unit 200 may be installed in front of a lamp of the refraction projection device 310 so as to refract projection light emitted from the lamp.

Meanwhile, the projection light refraction unit 200 may be configured to move its body, and the angle at which the projection light of the refraction projection device 310 is refracted may be changed by the movement of the body. Specifically, the projection light refraction unit 200 may be configured to perform a linear motion in a three-dimensional space or a rotational motion in a three-dimensional space, and the angle at which the projection light of the refraction projection device 310 is refracted can be changed by this linear or rotational motion (for reference, this linear or rotational motion may be implemented in various ways within a range apparent to those skilled in the art, such as an actuator, connection joint, rail, length-adjustable frame, etc.)

Therefore, the projection light of the refraction projection device 310 can be refracted in various directions in a three-dimensional space by the motion of the projection light refraction unit 200, and thus the projection light of the refraction projection device 310 can selectively reach all of the plurality of projection surfaces 100 arranged in various directions in a three-dimensional space. For example, the projection light of the refraction projection device 310 may selectively reach the left projection surface or the right projection surface as shown in FIG. 5 and may selectively reach the upper projection surface or the lower projection surface as shown in FIG. 6. Moreover, the projection light of the refraction projection device 310 may selectively reach various other projection surfaces present in the theater.

As a result, by the motion of the projection light refraction unit 200, the refraction projection device 310 can selectively project images on all of the plurality of projection surfaces 100, and thus the refraction projection device 310 can be used for multiple purposes. That is, by the operation of refracting the projection light of the refraction projection device 300, the refraction projection device 310 can be used for various purposes such as projecting an image on the left projection surface, projecting an image on the right projection surface, projecting an image on the upper projection surface, etc.

Meanwhile, the body of the refraction projection device 310 may also be configured to move. Specifically, the body of the refraction projection device 310 may also be configured to perform a linear motion or rotational motion in a three-dimensional space, and this motion of the refraction projection device 310 can change the refraction angle of the projection light more diversely and precisely.

The above-described operation of the refraction projection device 310 and the projection light refraction unit 200 may be controlled by the management device 400. Specifically, after electrically connecting the refraction projection device 310 and the projection light refraction unit 200, the management device 400 may control the operation of the refraction projection device 310 and the operation of the projection light refraction unit 200. For example, the management device 400 may be connected to an actuator for moving the projection light refraction unit 200 and control the motion of the projection light refraction unit 200, thus controlling the angle at which the projection light is refracted. Moreover, the management device 400 may transmit image data to the refraction projection device 310 and control the motion of the refraction projection device 310.

Moreover, the management device 400 may transmit different image data depending on the type of the projection surface 100 that the projection light of the refraction projection device 310 faces. For example, when the projection light of the refraction projection device 310 faces the left projection surface 100, the management device 400 may transmit image data to be projected on the left projection surface 100, and when the projection light of the refraction projection device 310 faces the right projection surface 100, the management device 400 may transmit image data to be projected on the right projection surface 100. Furthermore, when images are projected on the upper projection surface 100, the lower projection surface 100, the front projection surface 100, the rear projection surface 100, etc., the management device 400 may transmit different image data to be projected on the respective projection surfaces 100 (meanwhile, when the plurality of projection surfaces 100 are of different types, the management device 400 may correct the image data based on the differences in properties between the projection surfaces 100 and then transmit the corrected image data).

Furthermore, the management device 400 may control the operation of the projection light refraction unit 200 in real time based on an external input, etc., but may control the operation of the projection light refraction unit 200 based on a pre-stored database. Here, the database may store a plurality of operation mode information, which allows the projection light of the refraction projection device 310 to reach the respective projection surfaces 100, such as operation mode information (e.g., the arrangement angle of the reflection surface, three-dimensional position, etc.) for refracting the projection light on the left projection surface 100, operation mode information for refracting the projection light on the right projection surface 100, operation mode information for refracting the projection light on the upper projection surface 100, etc. Therefore, the management device 400 can selectively control the operation of the projection light refraction unit 200 based on the database, thus allowing the projection light of the refraction projection device 310 to selectively reach the plurality of projection surfaces 100 based on this control.

Meanwhile, the projection light refraction unit 200 may comprise a position sensor such as a 3-axis sensor, etc. Therefore, the management device 400 may be connected to the sensor to feed back the operation state of the projection light refraction unit 200 and manage whether the projection light refraction unit 200 operates normally, thus reducing errors associated with the refraction of the projection light.

Moreover, the refraction projection device 310 may comprise various sensors that can analyze performance information. Specifically, a light intensity sensor for detecting the light intensity of the lamp for generating the projection light, a humidity sensor for detecting the humidity in the device, a temperature sensor for detecting the temperature in the device, etc. may be installed in the refraction projection device 310, and these sensors may be connected to the management device and controlled. Therefore, the management device 400 can manage the light intensity information, maintenance information (temperature, humidity), etc. of the refraction projection device 310, thus managing the performance of the device related to the brightness, failure risk, etc.

Figure 8:
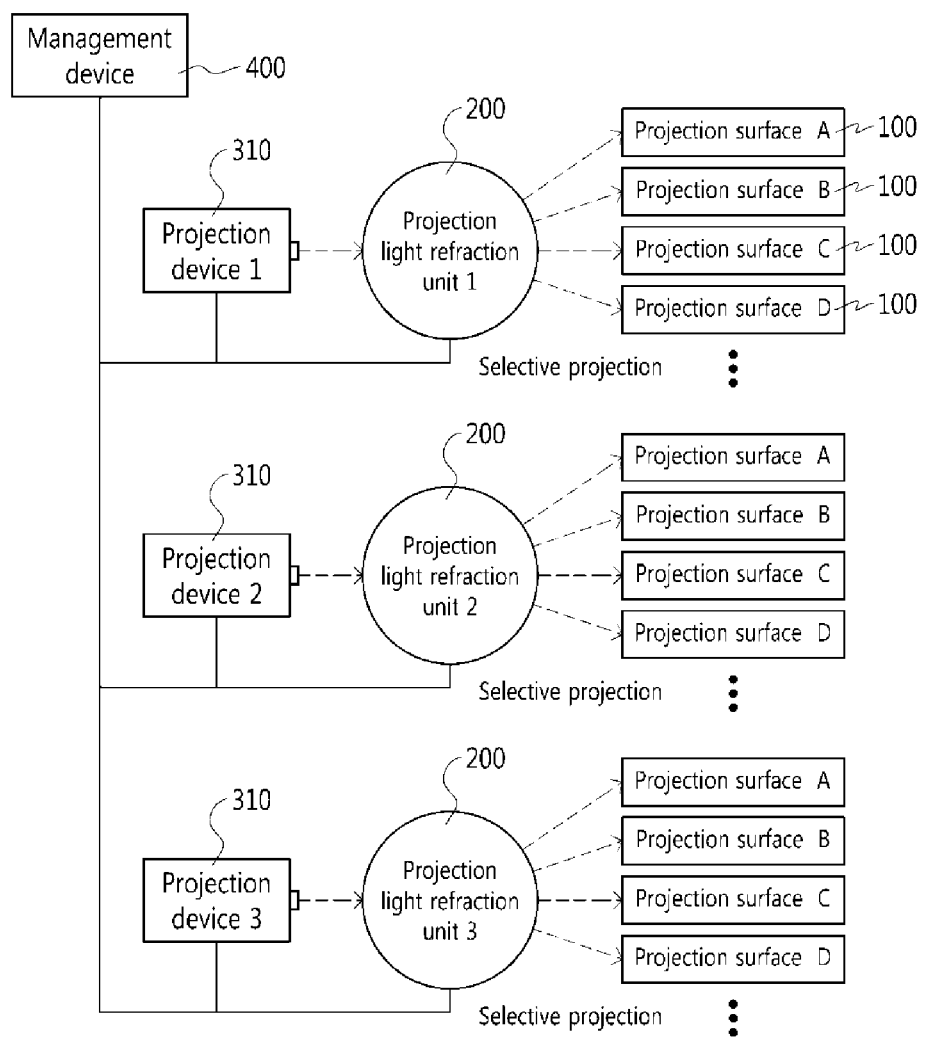
FIG. 8 is a diagram showing an example of a multi-projection system according to the present invention comprising a plurality of refraction projection devices.
Figure 9:
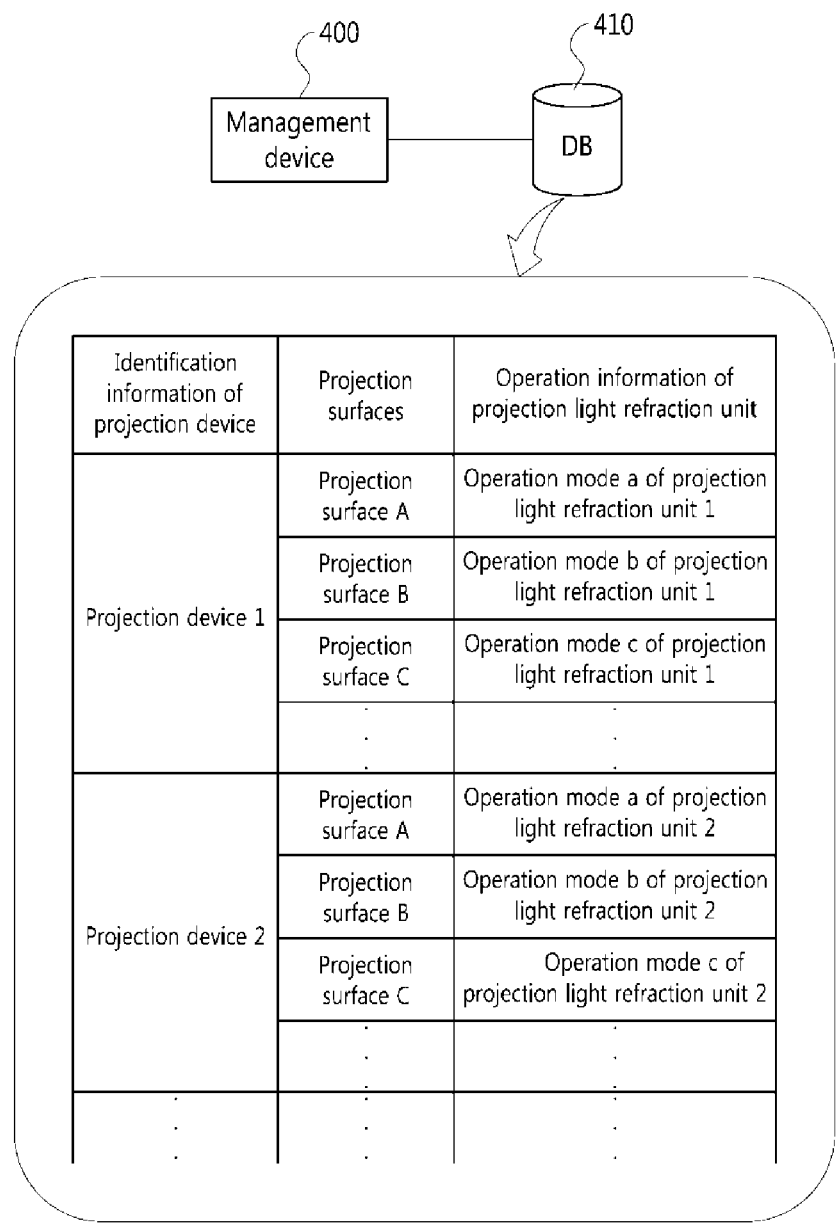
FIG. 9 is a diagram showing an example of a database that may be included in a management device.

Referring to FIG. 8, the multi-projection system in accordance with an embodiment of the present invention may comprise a plurality of refraction projection devices 310 and a plurality of projection light refraction units 200.

Here, it is preferable that the plurality of refraction projection devices 310 match the plurality of projection light refraction units 200 at a ratio of 1:1, and it is also preferable that each projection light refraction unit 200 is installed in a direction of the projection light of each refraction projection device 310 to refract the projection light of each refraction projection device 310.

Moreover, the plurality of refraction projection devices 310 and the plurality of projection light refraction units 200 may be connected to the management device 400 and generally controlled by the management device 400. In this case, the management device 400 may control the angle, at which the projection light of each refraction projection device 310 is refracted, by controlling each projection light refraction unit 200, thus allowing the projection light of each refraction projection device 310 to selectively reach the plurality of projection surfaces 100 based on this control. Furthermore, the management device 400 may configure a plurality of control groups (e.g., projection device 1-projection light refraction unit 1, projection device 2-projection light refraction unit 2, etc.) by matching each refraction projection device 310 with each projection light refraction unit 200 and may perform the control operation in units of control groups.

Meanwhile, the management device 400 may comprise a database storing information for controlling the operation of the plurality of refraction projection devices 310 and the plurality of projection light refraction units 200 and may control the operation of the plurality of refraction projection devices 310 and the plurality of projection light refraction units 200 based on the information stored in the database. An embodiment of the database will now be described with reference to FIG. 9. Identification information of each refraction projection device 310 and operation information of each projection light refraction unit 200 may be stored in the database in a matching manner. Moreover, the operation information of each projection light refraction unit 200 may contain a plurality of operation mode information (e.g., the arrangement angle of the reflection surface, three-dimensional position, etc.) for selectively refracting the projection light on the plurality of projection surfaces 100. For example, identification information of "projection device 1" and operation information of "projection light refraction unit 1" may be stored in the database in a matching manner. Here, the operation information of "projection light refraction unit 1" may contain a plurality of operation mode information. Specifically, the operation information of "projection light refraction unit 1" may contain a plurality of operation mode information such as (i) "operation mode a" for refracting the projection light of "projection device 1" on "projection surface A", (ii) "operation mode b" for refracting the projection light of "projection device 1" on "projection surface B", (iii) "operation mode c" for refracting the projection light of "projection device 1" on "projection surface C", etc.

Therefore, the management device 400 can selectively refract the projection light of each refraction projection device 310 on the plurality of projection surfaces 100 based on the information stored in the database.

Meanwhile, it is preferable that the operation information of each projection light refraction unit 200 stored in the database is set within a range in which the projection lights projected by the plurality of refraction projection devices 310 do not overlap each other. For example, when projection device 1 projects an image on projection surface A by means of projection light refraction unit 1 operating in operation mode a and when projection device 2 projects an image on projection surface B, which is adjacent to projection surface A, by means of projection light refraction unit 2 operating in operation mode b, information on operation mode a of projection light refraction unit 1 (e.g., the arrangement angle of the reflection surface, three-dimensional position, etc.) and information on operation mode b of projection light refraction unit 2 may be set, and information on other operation modes may be set within this range.

The multi-projection system may project images on the plurality of projection surfaces 100 using the plurality of refraction projection devices 310. However, in this case, since each refraction projection device 310 can selectively project an image on all of the plurality of projection surfaces 100, the refraction projection device 310 responsible for each projection surface 100 is not predetermined, but may be changed under the control of the management device 400.

For example, when it is assumed that the plurality of projection surfaces 100 comprise projection surface A, projection surface B, projection surface C, and projection surface D and that the plurality of refraction projection devices 310 comprise projection device 1, projection device 2, projection device 3, and projection device 4, the refraction projection device 310 for projecting an image on each projection surface 100 may be changed under the control of the management device 400. Specifically, under the control of the management device 400, the multi-projection system may be configured in a manner that (i) projection device 1 projects an image on projection surface A, projection device 3 projects an image on projection surface B, projection device 4 projects an image on projection surface C, and projection device 1 projects an image on projection surface D or (ii) projection device 2 projects an image on projection surface A, projection device 4 projects an image on projection surface B, projection device 1 projects an image on projection surface C, projection device 3 projects an image on projection surface D, and the multi-projection system may be configured with various other combinations of the "refraction projection device 310" and the "projection surface 100".

Moreover, since the multi-projection system projects images using the plurality of refraction projection devices 310, which do not need to be installed to face specific projection surfaces 100, the plurality of refraction projection devices 310 can be freely arranged at various positions in the theater. For example, the multi-projection system may arrange the plurality of refraction projection devices 310 in a specific place together or in a blind spot or rear that is outside the field of view of the audience. Therefore, the multi-projection system can easily perform the integrated management of the refraction projection devices 310 with this arrangement structure and can prevent the immersion of the audience from being reduced by the projection devices 300 present within the field of view.

Meanwhile, the multi-projection system may comprise a larger number of refraction projection devices 310 than the number of projection devices required to project images on the plurality of projection surfaces 100. That is, when the number of necessary projection devices for projecting images on the plurality of projection surfaces 100 is N, the multi-projection system may comprise an M number of refraction projection devices 310 that is greater than N. Therefore, in this embodiment, the multi-projection system may select an N number of refraction projection devices 310 from the prepared M number of refraction projection devices 310 according to certain criteria and may project images on the plurality of projection surfaces 100 using the selected N number of refraction projection devices 310.

Here, the criteria by which the multi-projection system selects the N number of refraction projection devices 310, which will be used for the image projection, may be set based on a variety of information, but may preferable be set based on performance information (e.g., light intensity information, maintenance information, etc.) of each refraction projection device 310. The reason for this is that the quality of the images projected on the respective projection surfaces 100 can be ensured based on the performance information of each refraction projection device 310 and a refraction projection device having a problem in the performance can be automatically eliminated.

Moreover, in this case, the performance analysis of each refraction projection device 310 and the selection of the refraction projection devices 310, which will be used for the image projection, may be performed by the management device 400. Specifically, the management device 400 may analyze the performance of an M number of projection devices 300 and then select an N number of refraction projection devices 310 that will be used for the image projection. Moreover, the management device 400 may allow the images to be projected on the plurality of projection surfaces 100 by controlling the angle at which the projection lights of the selected projection devices 300 are refracted. For example, the management device 400 may analyze the light intensity information of each refraction projection device 310 and then select refraction projection devices having high light intensity. Moreover, the management device 400 may analyze the information on internal temperature or humidity of each refraction projection device 310 and then exclude refraction projection devices having internal temperature or humidity exceeding a predetermined reference value. Furthermore, the management device 400 may collect resolution information of each refraction projection device 310 and then select refraction projection devices having high resolution. In addition, the management device 400 may collect repair information of each projection device 300 and then exclude refraction projection devices having frequent repair history.

Figure 10:
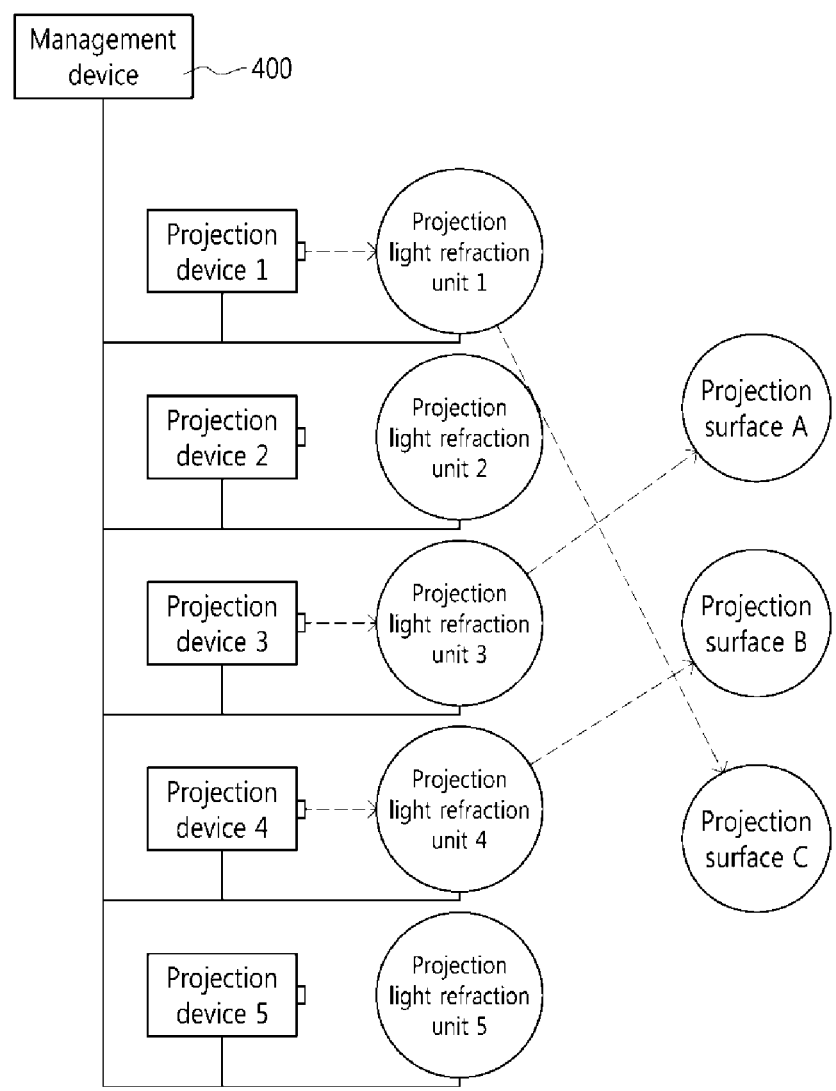
FIG. 10 is a conceptual diagram showing that a multi-projection system according to the present invention selects projection devices according to certain criteria and then projects images.

An embodiment will now be described with reference to FIG. 10. The management device 400 may select three refraction projection devices 310 (projection devices 1, 3 and 4) from a total of five refraction projection devices 310 based on the performance information and may allow images to be projected on projection surfaces A, B and C by controlling the selected projection device 1 and corresponding projection light refraction unit 1, the selected projection device 3 and corresponding projection light refraction unit 3, and the selected projection device 4 and corresponding projection light refraction unit 4. Meanwhile, since each of the selected projection light refraction units can project an image on projection surface A, B or C, the management device 400 can freely determine the refraction projection devices 310 that will project images on the respective projection surfaces 100. However, in the embodiment of FIG. 10, the management device 400 controls the image projection operation in the form of 1→C, 3→A, and 4→B. Therefore, in this case, the management device 400 transmits image data to be projected on projection surface C to projection device 1, transmits image data to be projected on projection surface A to projection device 3, and transmits image data to be projected on projection surface B to projection device 4.

Next, a multi-projection system in accordance with another embodiment of the present invention will be described with reference to FIGS. 11 and 12.

Figure 11:
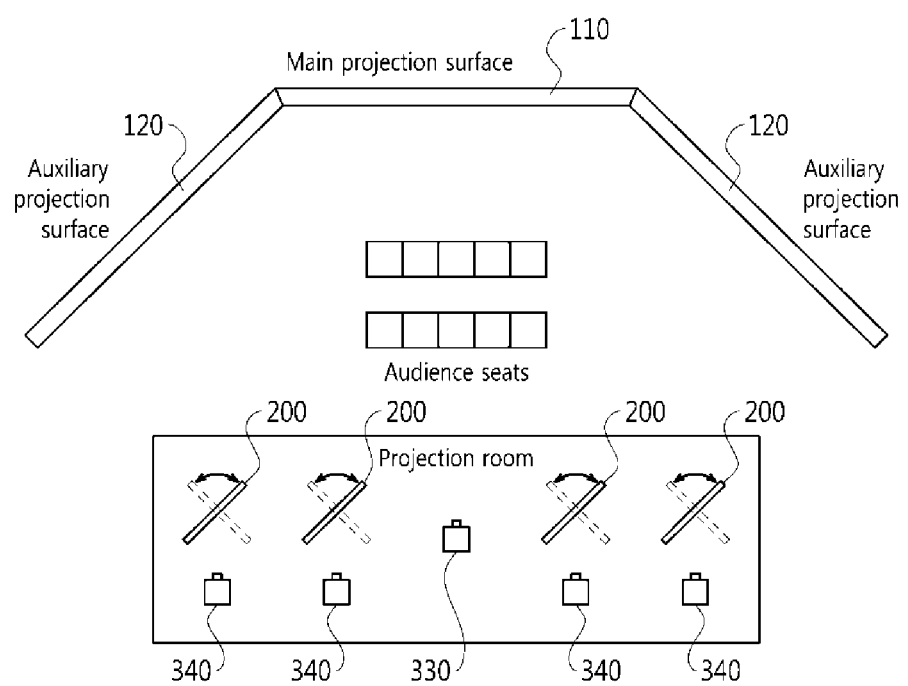
FIG. 11 is a diagram showing the configuration of a multi-projection system comprising a main projection device and auxiliary projection devices.

Referring to FIG. 11, the multi-projection system in accordance with another embodiment of the present invention may comprise a plurality of projection surfaces 100, and in this case, the plurality of projection surfaces 100 may be divided into a main projection surface 110 and auxiliary projection surfaces 120.

Here, the main projection surface 110 is a projection surface on which a main image is to be projected and refers to a projection surface 100 that is arranged in front of the auditorium to project the main image throughout the entire screening time.

Moreover, the auxiliary projection surfaces 120 are arranged around the main projection surface 110 and refer to projection surfaces on which auxiliary images for assisting the main image are projected. The auxiliary images may be projected on the auxiliary projection surfaces 120 in various ways. For example, (i) the auxiliary images synchronized with the main image may be projected throughout the entire screening time or (ii) the auxiliary images synchronized with the main image may be projected at a specific time among the entire screening time. Meanwhile, in the latter case, the specific time at which the auxiliary images are projected may be determined based on a time code of the main image or based on the recognition of an object in the main image. For example, the management device 400 may control the auxiliary images to be projected only in a predetermined time zone among the entire screening time or may analyze the main image (e.g., the appearance, color, movement pattern, etc.) in real time and then control the auxiliary images to be projected only at a time when a predetermined specific object (e.g., rain, flame, cloud, etc.) is recognized.

The multi-projection system in accordance with another embodiment of the present invention may comprise a main projection device 330 for projecting a main image on the main projection surface 110 and auxiliary projection devices 340 for projecting auxiliary images on the auxiliary projection surfaces 120, and it is preferable that the auxiliary projection surfaces 120 and the auxiliary projection devices are two or more in number, respectively. Moreover, the operation of main projection device 330 and the operation of auxiliary projection devices 340 may be controlled by the management device 400.

Moreover, it is preferable that the two or more auxiliary projection devices 340 are configured in the form of the above-described refraction projection device 310, and thus the two or more auxiliary projection devices 340 may be installed so as not to face specific auxiliary projection surfaces 120. In particular, the two or more auxiliary projection devices 340 may be installed to face the main projection surface 110 together with the main projection device 330 and may be installed in the same space such as a projection room, for example. Therefore, the management of the plurality of projection devices 300 can be easily performed by this integrated arrangement.

Furthermore, the two or more auxiliary projection devices 340 may be provided in a number greater than that required to project images on the two or more auxiliary projection surfaces 120. Therefore, in this case, the management device 400 may analyze the performance of the two or more auxiliary projection devices 340 and then select auxiliary projection devices 340, which will be used for the image projection, based on the analysis information. Moreover, the management device 400 may project images on the two or more projection surfaces 120 using only the selected auxiliary projection devices 340 (the above description related to the performance analysis may be applied herein).

Meanwhile, when the main projection device 330 does not operate normally, the multi-projection system in accordance with another embodiment of the present invention may allow the auxiliary projection device 340 configured in the form of the refraction projection device 310 to substitute for the main projection device 330. Since the auxiliary projection device 340 configured in the form of the refraction projection device 310 can project an image even on the main projection surface 110 by the refraction of the projection light, this substitution system can be configured.

In this case, the management device 400 may select a specific projection device 300, which will serve as the main projection device 330, from the two or more auxiliary projection devices 340 and transmit main image data to the selected projection device 300 such that the selected projection device 300 serve as the main projection device 330.

Moreover, the management device 400 may select the specific projection device 300, which will serve as the main projection device 330, in various ways. For example, the management device 400 may analyze the performance of the two or more auxiliary projection devices 340 and allow an auxiliary projection device 340 having the best performance to substitute for the main projection device 300. In this case, the management device 400 may analyze the performance of each auxiliary projection device 340 by analyzing light intensity information, maintenance information (temperature information, humidity information), resolution information, etc. of each auxiliary projection device 340 and may allow an auxiliary projection device 340, which is determined to have the best performance, to substitute for the main projection device 330.

Figure 12:
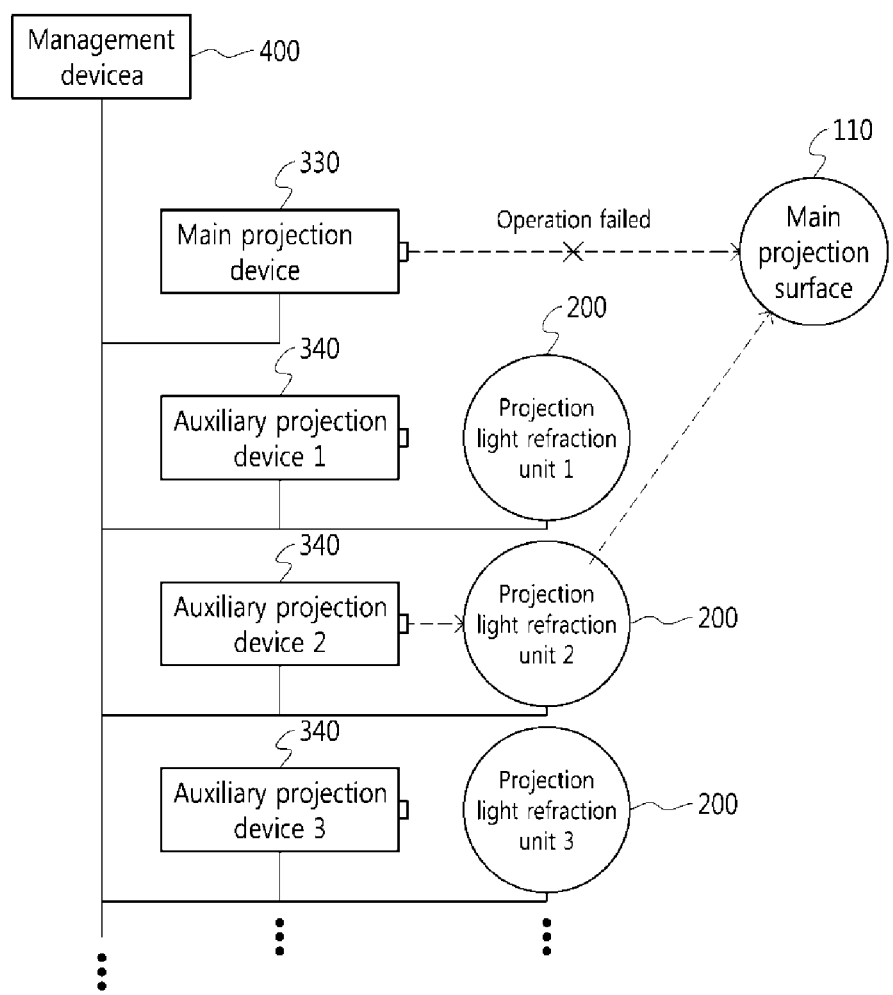
FIG. 12 is a conceptual diagram showing that a multi-projection system according to the present invention allows a refraction projection device to substitute for a main projection device.

Referring to FIG. 12, an example in which the main projection device 330 for projecting the main image on the main projection surface 110 has a failure is shown. In this case, in order to select an auxiliary projection device 340 that will substitute for the main projection device 330, the management device 400 analyzes the performance of the refraction projection devices 310 (i.e., auxiliary projection devices 1, 2, 3, etc.) and selects an auxiliary projection device having the best performance (e.g., auxiliary projection device 2) based on the analysis result. Moreover, the management device 400 transmits main image data to the selected auxiliary projection device and allows the projection light of the selected auxiliary projection device to direct to the main projection surface 110 by controlling the operation of the selected auxiliary projection device and the corresponding projection light refraction unit.

Next, a multi-projection system in accordance with still another embodiment of the present invention will be described with reference to FIG. 14.

The multi-projection system in accordance with still another embodiment of the present invention may maximize the projection area projected by the refraction projection device 310 by controlling the operation of the projection light refraction unit 200. Specifically, the multi-projection system may allow a single refraction projection device 310 to project an image on two or more projection surfaces by controlling the operation of the projection light refraction unit 200.

Figure 14:
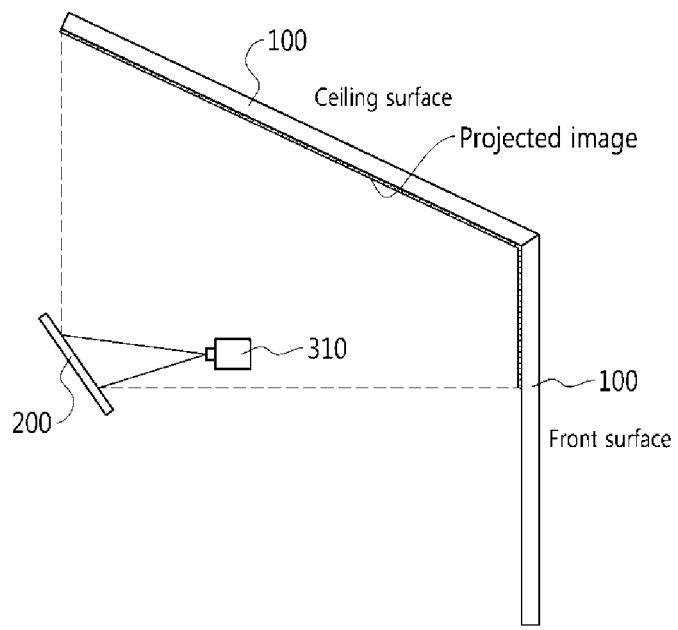
FIG. 14 is a diagram showing another example of a multi-projection system according to the present invention.

This embodiment is shown in FIG. 14.

In this case, the management device 400 included in the multi-projection system may calculate the position and angle of the projection light refraction unit 200, by which the projection area can be maximized (to project an image on two or more projection surfaces), based on simulation or input information (input through an input device or communication unit) and may control the motion of the projection light refraction unit 200 based on the calculation result.

Moreover, when an image of a specific refraction projection device 310 is projected on two or more projection surfaces, the management device 400 may correct the image projected by the specific refraction projection device 310, and in this case, the correction may be performed based on differences in properties between the two or more projection surfaces (which has been described above and thus detailed description thereof will be omitted). Furthermore, the correction may include edge blending for implementing a smooth image on the boundary between the projection surfaces.

Next, a multi-projection system in accordance with yet another embodiment of the present invention will be described.

The multi-projection system in accordance with yet another embodiment of the present invention may perform an image correction process based on "input information" (input information of a user, etc.). Specifically, the multi-projection system may perform the image correction process based on information input through an input device or communication unit.

In this case, the management device 400 may generate a correction profile based on information input from each projection device 300, without generating the correction profile by its own calculation. Moreover, the management device 400 may store the generated correction profile in a database and may use the stored correction profile in the next image correction process.

Furthermore, when it is recognized that the position or angle of the projection light refraction unit 200 is changed, the management device 400 may recognize that a new correction profile is needed to be prepared and may request the input of new correction information through a communication unit or output unit (e.g., a display device).

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:
1. A multi-projection system comprising:
a plurality of projection surfaces arranged so as not to be parallel to each other;

two or more projection devices for projecting images on the plurality of projection surfaces, wherein the two or more projection devices comprise a refraction projection device in which projection light is refracted before it reaches a projection surface; and a projection light refraction unit for refracting the projection light of the refraction projection device, wherein the projection light refraction unit changes the angle, at which the projection light of the refraction projection device is refracted, by movement of its body, and wherein the projection light of the refraction projection device selectively reaches all of the plurality of projection surfaces by the movement of the projection light refraction unit.

2. The multi-projection system of claim 1, wherein the refraction projection device and the projection light refraction unit are provided plurally, each projection light refraction unit being provided in a one to one correspondence with each refraction projection device and refracting the projection light of respective refraction projection device to which the each projection light refraction unit corresponds.

3. The multi-projection system of claim 2, wherein the plurality of refraction projection devices are installed together in a space that does not affect the field of view of an audience.

4. The multi-projection system of claim 2, further comprising a management device for controlling the plurality of refraction projection devices and the plurality of projection light refraction units, wherein the management device controls the angle, at which the projection light of each refraction projection device is refracted, by controlling each projection light refraction unit.

5. The multi-projection system of claim 4, wherein the management device allows each refraction projection device to selectively project an image on all of the plurality of projection surfaces by controlling the angle at which the projection light of each refraction projection device is refracted.

6. The multi-projection system of claim 4, wherein the management device stores identification information of each refraction projection device and operation information of each projection light refraction unit in a matching manner, the operation information of each projection light refraction unit comprising a plurality of operation mode information.

7. The multi-projection system of claim 4, wherein the management device analyzes performance information of the plurality of refraction projection devices to select refraction projection devices that will be used for image projection and controls the angle, at which the projection light of each of the selected refraction projection devices is refracted, to allow images to be projected on the plurality of projection surfaces.

8. The multi-projection system of claim 7, wherein the performance information comprises light intensity information of the refraction projection device, resolution information of the refraction projection device, or maintenance information of the refraction projection device.

9. The multi-projection system of claim 1, wherein the two or more projection devices comprise a main projection device for projecting an image on a main projection surface.

10. The multi-projection system of claim 9, further comprising an auxiliary projection device for projecting an image on an auxiliary projection surface arranged around the main projection surface, wherein the auxiliary projection device is configured in the form of the refraction projection device.

11. The multi-projection system of claim 10, wherein the main projection device and the auxiliary projection device are arranged together in a space that does not affect the field of view of an audience.

12. The multi-projection system of claim 10, wherein the auxiliary projection device projects an image at the entire time or at a specific time when the main projection device projects the image and the projection light of the auxiliary projection device is projected after being refracted.

13. The multi-projection system of claim 9, wherein the refraction projection device projects an image on the main projection surface on behalf of the main projection device in the event of a failure of the main projection device.

14. The multi-projection system of claim 13, wherein the refraction projection device is provided plurally and a refraction projection device, which is determined to have the best performance among the plurality of refraction projection devices, projects an image on behalf of the main projection device.

15. The multi-projection system of claim 1, wherein when the plurality of projection surfaces are of different types, the two or more projection devices project corrected images, and the correction is performed so as to offset differences in properties between the projection surfaces.

16. The multi-projection system of claim 15, wherein the differences in properties comprise a difference in brightness, a difference in chromaticity, or a difference in reflectance.

* * * * *